US008255326B2

(12) United States Patent
Compiano

(10) Patent No.: US 8,255,326 B2
(45) Date of Patent: Aug. 28, 2012

(54) METHOD AND APPARATUS FOR MAPPING SOURCES AND USES OF CONSUMER FUNDS

(75) Inventor: Craig Compiano, Tampa, FL (US)

(73) Assignee: The Western Union Company, Englewood, CO (US)

( * ) Notice: Subject to any disclaimer, the term of this patent is extended or adjusted under 35 U.S.C. 154(b) by 200 days.

(21) Appl. No.: 12/498,272

(22) Filed: Jul. 6, 2009

(65) Prior Publication Data

US 2009/0327127 A1 Dec. 31, 2009

Related U.S. Application Data

(63) Continuation of application No. 10/168,871, filed as application No. PCT/US00/33750 on Dec. 13, 2000, now abandoned.

(60) Provisional application No. 60/173,691, filed on Dec. 29, 1999.

(51) Int. Cl.
*G06Q 30/00* (2012.01)

(52) U.S. Cl. ............. 705/40; 705/30; 705/35; 705/36 R; 705/37; 705/38; 705/39; 705/41; 705/42; 705/43

(58) Field of Classification Search .................... 705/38, 705/39, 42, 26.1, 30, 35, 36 R, 37, 40, 41, 705/43
See application file for complete search history.

(56) References Cited

U.S. PATENT DOCUMENTS

| | | | |
|---|---|---|---|
| 4,270,042 A | 5/1981 | Case | |
| 4,727,243 A | 2/1988 | Savar | |
| 5,214,579 A | 5/1993 | Wolfberg et al. | |
| 5,557,518 A | 9/1996 | Rosen | |
| 5,649,117 A | 7/1997 | Landry | |
| 5,684,965 A | 11/1997 | Pickering | |
| 5,689,649 A * | 11/1997 | Altman et al. | 705/36 R |
| 5,699,528 A | 12/1997 | Hogan | |
| 5,875,435 A | 2/1999 | Brown | |
| 5,920,848 A | 7/1999 | Schutzer et al. | |
| 5,946,669 A | 8/1999 | Polk | |
| 5,987,436 A * | 11/1999 | Halbrook | 705/36 R |

(Continued)

OTHER PUBLICATIONS

Guttentag, J., "Your Mortgage: There's No Magic Needed to Repay Your Home Loan Early," Los Angeles Times, Jul. 5, 1998, http://articles.latimes.com/print/1998/jul/05/realestate/re-831, 1 page.

(Continued)

*Primary Examiner* — Yogesh C Garg
(74) *Attorney, Agent, or Firm* — Kilpatrick Townsend & Stockton LLP

(57) ABSTRACT

A bill-paying system includes a customer deposit account which receives periodic payroll deposits of an individual or a couple. A bill-paying service enrolls the individual or couple for a fee, and is authorized to transfer money from the deposit account to the accounts of various creditors. An originating depository financial institution, such as a bank, handles the transfers of money, and such transfers are preferably done electronically. The automated clearing house (ACH) network supports such electronic money transfers. The various bills and debts of the individual or couple come due at times that are asynchronous to their income structure. The bill-paying service is authorized to debit the deposit account for more than the basic minimums due the creditors each month. Such excess is used to accelerate the repayment of various loans and debts according to what particular application at that time will have the greatest long-term beneficial effect.

14 Claims, 13 Drawing Sheets

U.S. PATENT DOCUMENTS

| | | | |
|---|---|---|---|
| 6,032,133 | A | 2/2000 | Hilt et al. |
| 6,041,315 | A | 3/2000 | Pollin |
| 6,223,168 | B1 | 4/2001 | McGurl et al. |
| 6,253,203 | B1 | 6/2001 | O'Flaherty et al. |
| 6,269,347 | B1 | 7/2001 | Berger |
| 6,304,860 | B1 | 10/2001 | Martin, Jr. et al. |
| 6,401,079 | B1 | 6/2002 | Kahn et al. |
| 6,430,542 | B1 | 8/2002 | Moran |
| 6,493,680 | B2 | 12/2002 | Logan et al. |
| 6,606,606 | B2 | 8/2003 | Starr |
| 6,611,818 | B1 | 8/2003 | Mersky et al. |
| 6,850,996 | B2 | 2/2005 | Wagner |
| 6,904,412 | B1 | 6/2005 | Broadbent et al. |
| 7,089,208 | B1 | 8/2006 | Levchin et al. |
| 2001/0013017 | A1* | 8/2001 | Berger ............................. 705/38 |
| 2001/0032183 | A1 | 10/2001 | Landry |
| 2002/0038289 | A1* | 3/2002 | Lawlor et al. ................... 705/42 |
| 2002/0095651 | A1 | 7/2002 | Kumar et al. |
| 2002/0156733 | A1 | 10/2002 | Shimada et al. |
| 2003/0074311 | A1 | 4/2003 | Saylors et al. |
| 2003/0208445 | A1 | 11/2003 | Compiano |
| 2004/0078318 | A1 | 4/2004 | Miller |
| 2006/0271465 | A1 | 11/2006 | McNamar et al. |

OTHER PUBLICATIONS

Joinson, C., "Pay Attention to Pay Cycles," HR Magazine, Alexandria: Nov. 1998, issue 12, http://proquest.umi.com.proxy.lib.umich.edu/pqdweb?did=36219349&sid=1&Fmt=3&clientId=17822&RQT=309&VName=PQD, 4 pages.

Lazarony, L., "Paying Off High Credit Card Debt—Pick an Approach and Do It," Bankrate.com, Sep. 21, 1999, http://web.archive.org/web/19990922005549/http://www.bankrate.com/brm/news/cc/19980713.asp, 3 pages.

Meyer, G., "Plan Payments to Save on Interest," Kansas City Star, May 7, 1995, http://w3.nexis.com/new/results/docview/docview.do?ris...2974990991, 2 pages.

Palestrant, V., "Cutting Corners; Banking," Sydney Morning Herald, Feb. 19, 1997, http://newsstore.smh.com.au/apps/viewDocument.ac?page=1&sy=smh&kw=cutting+corners&pb=smh&dt=selectRange&dr=entire&so=relevance&sf=text&sf=headline&rc=10&rm=200&sp=nrm&clsPage=1&docID=news970219_0105_4792, 4 pages.

Patchett, S., "There Are Many Ways to Pay Off Credit Card Debt Find One That Suits You," The Post-Standard, Syracuse, New York, Oct. 21, 1996, http://w.3.nexis.com.new.results.docview.docview.do?ri...71525839, 2 pages.

* cited by examiner

METHOD AND APPARATUS FOR MAPPING SOURCES AND USES OF CONSUMER FUNDS

CROSS-REFERENCES TO RELATED APPLICATIONS

This application is a continuation of commonly assigned, co-pending U.S. patent application Ser. No. 10/168,871, filed Nov. 13, 2002, entitled "Method And Apparatus For Mapping Sources And Uses Of Consumer Funds," which is a national phase of International Patent Application No. PCT/US00/33750, filed Dec. 13, 2000, entitled "Method And Apparatus For Mapping Sources And Uses Of Consumer Funds," which claims the benefit of U.S. Provisional Patent Application No. 60/173,691, filed Dec. 29, 1999, entitled "Debt Repayment Acceleration System", all of which are incorporated by reference in their entirety for any and all purposes.

BACKGROUND OF THE INVENTION

1. Technical Field

The present invention relates to plans for repaying mortgage loans and other installment debts on accelerated schedules, and more particularly to computer-implemented systems that organize, forward, and report the application of many individual consumer payments to their corresponding lenders and creditors with the objective of saving money over a standard installment repayment history.

2. Description of the Prior Art

In general, the unpaid principle of a mortgage or other type of loan is what earns interest for a lender at the agreed rate. Each monthly mortgage installment payment is usually applied first against the interest earned, and then any balance goes towards reducing the outstanding unpaid principle. The actual amount that goes towards reducing the principle can be relatively small, e.g., 10% of the payment. So it makes sense that if the borrower can make the payments a little more frequent than once a month or include more than the basic monthly payment, the principle will be reduced faster and the interest earned will be correspondingly reduced. For example, biweekly payments of half the monthly mortgage amount will result in 26-biweekly payments being made in a year. So paying biweekly results in one extra whole month's payment being accumulated each year. That alone could reduce the term of a 30-year mortgage by a couple of years and several thousand dollars being saved over the standard monthly payment schedule.

Commerce has always depended on the flow of value, i.e., companies and individuals paying what they owe and collecting what they've earned. The conduit for the flow of value is the payments system which has progressed from barter, to coins, to paper currencies, to checks, and lately to electronic payments. In decades past, cash and checks were the preferred payment calculators for consumers and businesses. Today, businesses, government agencies, and consumers feel the burden of paper overload as more than sixty-three billion checks are processed every year. Each check must be written or printed, signed and mailed, and then retrieved, reconciled, and stored. With increasing incidents of check fraud and a strong emphasis on privacy, traditional check-issuers are demanding more secure and confidential alternatives provided by electronic payments.

Direct deposit is the automatic deposit of all or part of employees' pay, retirees' pension and annuities, and other business deposits to consumers' checking and/or savings accounts. Instead of printing checks, the employer or benefactor (originator) supplies a computer file containing a record for each participating employee/retiree/consumer to the businesses financial institution (the ODFI). The ODFI assures correct formatting and transmits the file to the automatic clearing house (ACH) operator for delivery to the employees'/retirees'/consumers' (receivers') depository accounts at their financial institutions (RDFI's).

In the case of direct deposit of payroll, the employer provides the employee on payday information regarding gross pay, payroll deductions, tax withholding, net pay, and other appropriate details. Similarly, businesses supply other appropriate data to pensioners, annuitants, and consumers regarding the credits to their depository accounts. Direct payment and home banking/bill payment services save consumers time and money by eliminating checks, check handling, and postage. With direct payment, consumers preauthorize electronic debits to their depository accounts for types of recurring bill payments such as insurance premiums, utility bills, all types of loan payments, mortgages, club memberships, subscriptions, and charitable contributions. To initiate direct payment, consumers must provide a written authorization to their participating billing companies, clubs, charities, etc. Authorizations may be cancelled at the discretion of the consumer according to the procedures outlined in the authorization. Cancellation of direct payment has no effect on the consumers' financial obligation to the billing company. With appropriate authorization, the billing company originates a computer file containing payment information. The company's financial institution transmits the debit through the ACH-network to the consumer's depository account.

When consumers choose to participate in conventional home banking/bill payment services, they can initiate their bill payments by telephone, computer, or other calculators. The consumer's service provider initiates ACH debits from the consumer's bank account and ACH credits to the consumers billing account for the authorized payment. Home banking/bill payment services are offered by various financial institutions and other private service providers throughout the United States.

Direct payment and home banking services provide benefits to both companies and consumers. Companies reduce expenses associated with check processing and improve cash flows by reducing delinquencies and late billing procedures. Consumers reduce check and postage costs and save the time of manually preparing and mailing checks. In addition, consumers can reduce late fees, forget about payment deadlines, and make their account reconciliation process simpler. Consumers never relinquish control of their accounts. Direct payments and home banking/bill payment services may be terminated or modified at any time according to procedures outlined in the authorization agreement.

Electronic commerce can incorporate all aspects of the ordering, inventory, and payments processes of businesses. Companies may use electronic data interchange (EDI) to place orders; to update, control, and reorder inventories; to transmit billing statements; and to collect or make payments. The ACH-network is an efficient electronic payment alternative to checks and wire transfers to complement electronic commerce. Electronic business payments may be ACH debits or ACH credits depending on the needs of and the agreements among trading partners. The ACH-network provides an electronic payments calculators for financial EDI, Internet payments, corporate trading partner exchanges, corporate cash management, and other business-to-business transactions such as transmission of insurance and healthcare information and payments.

Financial EDI is the electronic movement of payments and payment-related information in standard formats through the banking system. Businesses of all sizes; state, local, and federal government agencies, and financial institutions are incorporating financial EDI into their payments practices to minimize the flow of paper, to reduce administrative costs, and to improve efficiencies. Businesses use the ACH-network to pay or to collect from corporate trading partners. The transaction sets of the ACH-network provide varying levels of payment transfers from the simplest to the most complex, including invoice numbers, discount, adjustment, and other remittance information.

In the 1990s, the Internet is becoming an increasingly important tool for business-to-business communications. Companies use the Internet to place orders, update inventories, and authorize payments. The ACH-network provides an efficient payments calculator to settle transactions initiated on the Internet.

Good corporate cash management techniques allow businesses to accelerate cash in-flows, manage account balances to reduce borrowing needs, improve earnings potential of operating capital, and precisely control cash disbursements. The ACH-network allows companies to move money between branches or offices quickly and reliably based on operating needs. Companies with geographically dispersed offices can use the ACH-network to draw funds into centralized accounts from widely-scattered financial institutions. Similarly, funds can be disbursed to remote operations as needed. The ACH-network is an efficient calculator to shift balances to and from centralized concentration accounts to effectively administer corporate operations.

SUMMARY OF THE INVENTION

The present invention includes a bill-paying system with a customer deposit account that receives periodic payroll deposits of an individual or a couple ("Subscriber"). A bill-paying service enrolls the individual or couple for a fee, and is authorized to transfer money from the deposit account to the accounts of various creditors. An originating depository financial institution, such as a bank, actually handles all the transfers of money, and such transfers are preferably all done electronically. The automated clearing house (ACH) network supports such electronic money transfers. The various bills and debts of the individual or couple come due at times that are asynchronous to their income structure. The bill-paying service is authorized to debit the deposit account for more than the basic minimums due all the creditors each month. Such excess is used to accelerate the repayment of various loans and debts according to what particular application at that time will have the greatest long-term beneficial effect.

Among the features of the preferred embodiment of the invention are:

1. Each subscriber may be associated with multiple transactions involving the movement of money;

2. A single subscription transaction table is provided which contains all data for moving money;

3. A subscriber can have one physical loan with multiple recurring payment records, i.e., there is a logical grouping of disbursements for a given instrument;

4. A trust finder function provides a join across multiple tables for trust arrangement to map money movement; and 5. A campaign product is provided for managing money based upon product type and destination of funds.

DETAILED DESCRIPTION OF THE INVENTION

Figure 1:
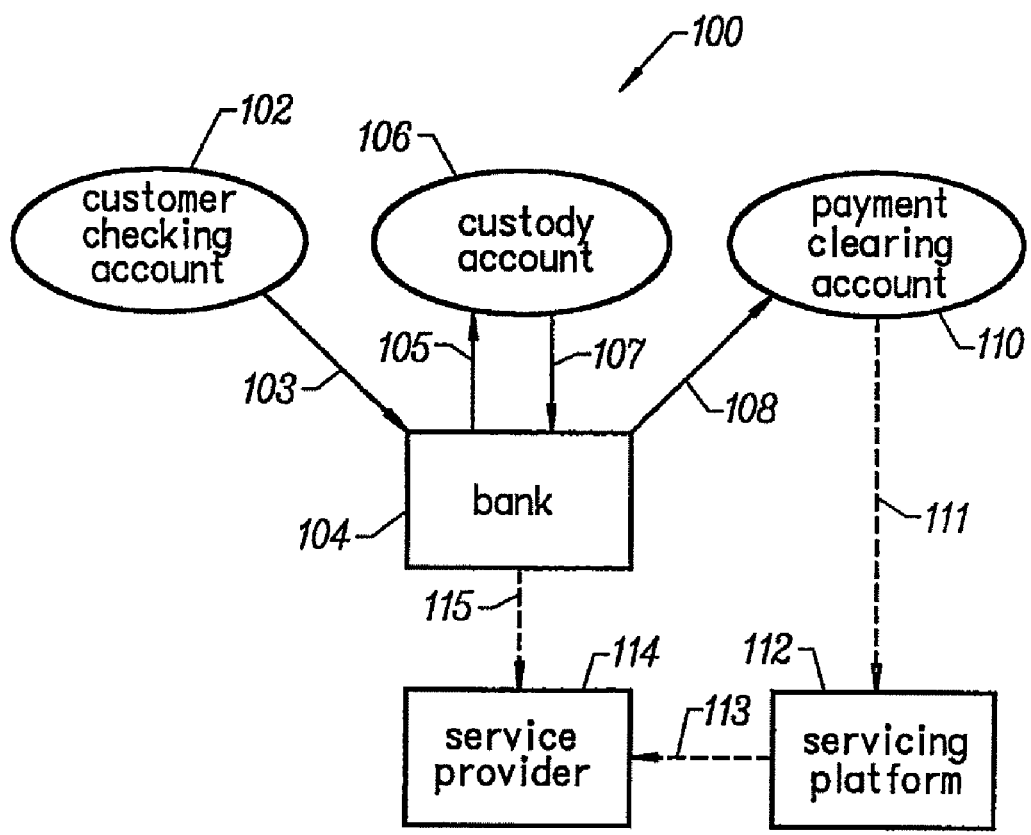
FIG. 1 is functional block diagram of a loan servicing system.

FIG. 1 represents a loan servicing system, and is referred to herein by the general reference numeral 100. A customer checking account 102 sources a transfer of funds 103 to a bank 104. A credit 105 is made to a custody account 106 that acts like a buffer. Money is stockpiled in the custody account 106 from the customer checking account 102 in amounts and times that are dependent on a customers ability to earn income. In effect, this is a front-end money-gathering subsystem. A series of partial payments are stored up over time.

A debit 107 is periodically made to issue a credit 108 to a payment clearing account 110. An advise 111 is returned to a servicing platform 112. So a back-end mortgage servicing or legacy subsystem is provided for posting payments, segregating and remitting funds, calculating interest, mortgage servicing, car loan type processing, etc. In an early development prototype system, the servicing platform 112 was provided by Computer Power, Inc., now a part of Alcatel. A communications link 113 allows a service provider 114 to direct the back-end mortgage servicing or legacy subsystem. Another communications channel 115 allows the service provider 114 to direct the front-end money-gathering subsystem. The servicing platform 112 was initially provided with mortgage servicing software, but it was discovered that this could be greatly expanded to service more than just the mortgages of a consumer. Many or all of the installment accounts could be simultaneously managed for many hundreds of customers. It is also possible for billers to present bills for the customer to pay that are delivered to the service provider 114, e.g., bills that require payment within ten days The custody account 106 would then be used by the servicing platform 112 to pay such "pay-on-demand" bills when previously authorized.

Figure 2:
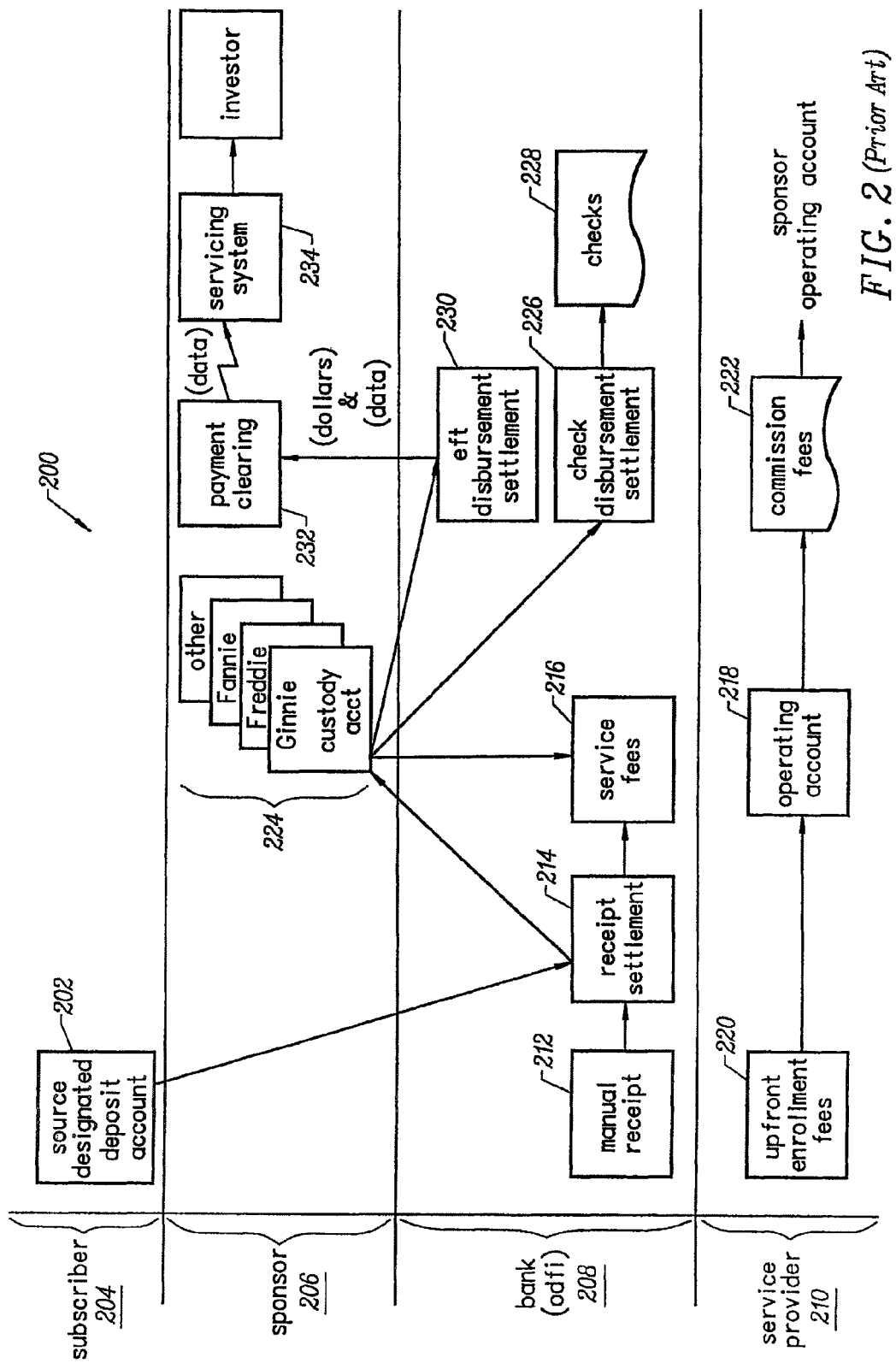
FIG. 2 is a functional block diagram of a money management system.

FIG. 2 represents a money management system that is referred to herein by the general reference numeral 200. A source designated deposit account (DDA) 202 belongs to a subscriber 204 and has money periodically deposited to it. For example, DDA 202 may be the joint account of a husband and wife where the husband gets paid by his employer every Friday and the wife by her employer every other Tuesday.

Between them, the couple (subscriber 204) have various installment loans and credit card debts that need to be paid on or before certain days of the month and with minimum payments for each. For example, a monthly payment is due to a sponsor mortgage lender 206. An originating depository financial institution (ODFI) 208, e.g., a bank, is authorized at instructed times and amounts to debit the DDA 202. The couple holding the DDA 202 have authorized a payment service provider 210 to instruct that funds be withdrawn from this account to pay the various creditors on time and with at least the required minimum payments. A pre-arranged payment and deposit (PPD) in ACH-format is used by the payment service provider 210. The peculiar income structure of the subscriber 204 is preferably used to advantage by the payment service provider 210 to make periodic payments on the installment loans and credit card debts. For such service, the subscriber 204 will pay the payment service provider 210 a fee, e.g., per use, per moth, etc.

The subscriber 204 can benefit by paying more than the minimums due on each account and by paying a monthly installment account in part on a weekly or biweekly basis. They will benefit by a more rapid decrease in the unpaid principle and therefore save on the interest charges that accrue on that unpaid principle each month. At the same time, it is imperative that there always be enough money on hand to pay each bill by its due date. So any acceleration of payments cannot leave the system 200 short of funds to pay any bill that normally comes due later in the month. The payment service provider 210 must therefore be instructed which creditors are to be paid, the terms of the loans involved, the income structure of the subscriber 204, and the total amounts authorized to be withdrawn at various times of the week, month, and year from DDA 202.

The movement of money in system 200 preferably uses the automated clearing house (ACH) network in the United States which is a central clearing facility that provides distribution and settlement of electronic financial transactions. ACH operators clear debits and credits electronically, rather than through the physical movement of checks. There are four ACH operators in the United States, the Federal Reserve System, Visanet ACH, new York ACH, and American ACH. The Federal Reserve System alone clears about eighty percent of all ACH transactions. Such ACH-network was formed in the early 1970's to provide an efficient alternative using electronic and telecommunications technology to replace paper check processing. The ACH system uses batch-processing, store and forward operations. ACH payments are not processed individually. Originating depository financial institutions (ODFI's) submit ACH payment files to the ACH operators. The ACH operators accumulate these files, sort them by destination, and transmit them to receiving depository financial institutions (RDFI's) for application to customers' accounts at predetermined times throughout the business day. The ACH system provides significant economies of scale compared to individual wire transfers, and is faster and more accurate than paper-check processing.

The ACH-network is a nationwide wholesale electronic payment and collection system now used by hundreds of thousands businesses and financial institutions.

Technological advances implemented by the ACH operators allow transactions to arrive at their destinations in a matter of hours. Entries are settled quickly, most often within one business day of origination. The ACH-network delivers electronic payments quickly, safely, reliably, and conveniently to financial institutions for their customers.

The ACH-network is not used only for consumer transactions such as direct deposit and direct payment, nor only for business-to-business transactions known as financial EDI. The ACH-network is also the settlement calculator for home-banking payments, credit card clearings, electronic benefit transfers (EBT), point-of-sale (POS) and Internet purchases, electronic check transmissions, and even automated teller machine (ATM) transactions. The ACH system provides the basic infrastructure for a wide variety of electronic payment applications.

The national automated clearing house association (NACHA) is a nonprofit banking trade association that promulgates the rules and operating guidelines for electronic payments, such as direct deposit, direct payment (preauthorized debits), financial EDI, electronic benefits transfers, third-party bill payments, electronic checks, and Internet payments. NACHA represents thirty-five regional ACH associations which have a total of more than 13,000 financial institution members. NACHA provides educational payments conferences, as well as marketing collateral and technical publications. NACHA can be accessed through the Internet at www.nacha.org.

An "ACH originator" is a company or other business entity that creates entries for introduction into the ACH-network. For example, an employer produces credit entries to pay employees who have authorized direct deposit. A utility or other billing company produces debit entries from customers' financial institution accounts who have authorized direct payment for products and services. A business produces financial EDI transactions to pay or collect trading partner obligations. ACH receivers are consumers, customers, employees, and other businesses who have authorized electronic payments by direct deposit, direct payment, or financial EDI to be applied against their depository accounts. An originating depository financial institution (ODFI) typically initiates and warrants electronic payments through the ACH-network on behalf of its customers. A receiving depository financial institution (RDFI) provides depository account services to consumers, employees, and businesses and accepts electronic payments to those accounts. The ACH-network transfers payments and related data through computer and high-speed communications technology, e.g., the Internet. ACH-network services can be divided into five broad categories, (1) direct deposit services, (2) direct payment and home banking services, (3) electronic commerce, (4) electronic benefits transfers, and (5) electronic checking.

Returning now to FIG. 2, the system 200 further includes a manual receipt 212 that can be accepted in addition to or instead of electronic transfer funds from DDA 202. Either way, a settlement account 214 is credited with the money. A services fee account 216 is credited by a debit to the settlement account 214 and transferred to an operating account 218 belonging to the payment service provider 210. An enrollment fee account 220 is used to receive up-front subscription fees that may be required for use of the payment service system 200 from the subscriber 204. A commission fees account 222 is used to receive miscellaneous fees that may be earned from the sponsor 206, the ODFI 208, or others. All such enrollment fees, service fees, and commissions contribute to the operating account of the service provider.

A number of earmarked custodial accounts 224 are credited with money debited from the settlement account 214 in the name of the client sponsor 206, e.g., at the request of the service provider 210 using ACH-format PPD. Such money is collected to pay an FNMA, GNMA, FHA, etc., mortgage loan, car loan, credit card debt, or other. Thus system 200 is based on an asynchronous debiting based on the subscriber's payroll cycles and crediting based on the due dates of various obligations. Prior art systems are simply driven to debit and credit solely on the due dates of the obligations.

Funds are then periodically withdrawn from the custodial accounts 224, in one case, to a check disbursement settlement account 226 so that a series of paper checks 228 can be issued. In another case, funds are periodically withdrawn from the custodial accounts 224 to an EFT disbursement settlement account 230. The service provider 210 instigates both these kinds of transfers with PPD instructions in ACH-format. After all the required payments are made, a curtailment can be calculated. Any surplus funds in the custodial accounts 224 will trigger a collection of unpaid service fees (USF). This results in a transfer of USF from custodial accounts 224 to the service fees account 216 by PPD in ACH-format. A corporate trade exchange (CTX) ACH-format is used to transfer funds from the EFT disbursement settlement account 230 to a sponsor payment clearing account 232. This is handled by an EDI process initiated by the service provider 210. Such CTX transfer can include BPR and ADX segments, for example. Payments are then ultimately transferred to a sponsor servicing system 234 from the sponsor payment clearing account 232. A standard lockbox layout format is used that is triggered by the receipt of the CTX transactions.

A typical transaction flow between the sponsor 206 and the service provider 210 includes a solicitation tape from the sponsor, new additions from the service provider, refresh records from the sponsor, account status changes from the service provider, and account status changes from the sponsor. Sponsor-generated transactions can also include investor sales/transfers, service releases, payoffs/paid-in-fulls, foreclosures, bankruptcies, payment changes, and delinquent payment information. Conversely, service-provider generated transactions can also include updated first payment dates, suspended accounts, terminated accounts, custodial account balances, next and last withdrawal information, reactivated accounts, and letter-writer queue records.

Figure 3:
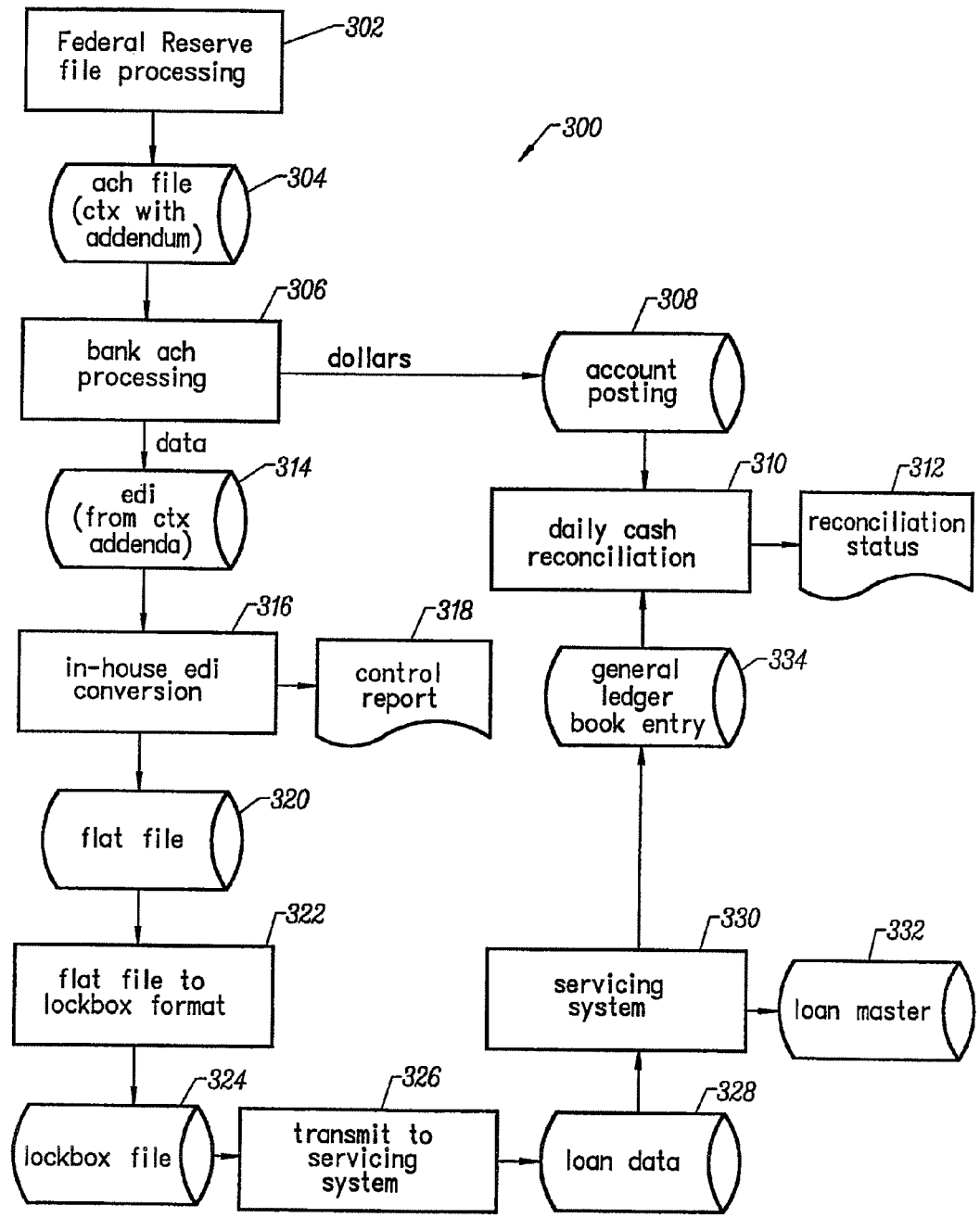
FIG. 3 is a flowchart diagram of a service provider and sponsor lockbox process embodiment of the present invention.

FIG. 3 represents a service provider and sponsor lockbox process 300. A step 302 begins with ACH file processing, e.g., by the Federal Reserve. This fills an ACH-file 304 in CTX format with addendums. A step 306 represents a bank's ACH processing, e.g., PepPlus. "Dollars" are then transferred to an account posting file 308 and contribute to a daily cash reconciliation report 310. A paper reconciliation status 312 is output. "Data" is transferred from the step 306 to an EDI file 314 from the CTX addenda. An in-house EDI conversion step 316, e.g., Sterling, is used to provide a control report 318 and a flat file 320. A flat-file to lockbox format conversion step 322 produces a lockbox file 324. Such is transmitted in a step 326 to a loan-data file 328. A serving system step 330 produces a loan-master file 332 and a general ledger book entry file 334. The daily cash reconciliation step 310 combines information from both the account posting file 308 and the general ledger file 334.

In general, embodiments of the present invention comprise a bill-paying system with a customer deposit account that receives periodic payroll deposits of an individual or a couple. A bill-paying service enrolls the individual or couple for a fee, and is authorized to transfer money from the deposit account to the accounts of various creditors. An originating depository financial institution, such as a bank, actually handles all the transfers of money, and such transfers are preferably all done electronically. The ACH-network supports such electronic money transfers. The various bills and debts of the individual or couple come due at times that are asynchronous to their income structure. The bill-paying service is authorized to debit the deposit account for more than the basic minimums due all the creditors each month. Such excess is used to accelerate the repayment of various loans and debts according to what particular application at that time will have the greatest long-term beneficial effect.

The ACH-network is based on a series of agreements-between the company and its financial institutions, between trading partners, between the employer and its employees/retirees, between the billing company and its customers, among financial institutions, and between the financial institution and its customers. The basis for these agreements is the ACH rules: a complete guide to the rules and regulations governing the ACH-network. These rules and operating guidelines are developed and promulgated by the national automated clearing house association (NACHA). Rules and conventions for specific applications such as cross-border payments, financial EDI, electronic benefits transfers (EBT), electronic check, and consumer-initiated bill payments are developed by NACHA's councils: the cross-border council, the bankers EDI council, the EBT council, the electronic check council, the bill payment council, and the Internet council.

In order to participate in electronic payments, businesses must enter into agreements with the originating financial institutions of their choice and with the receivers of the transactions, e.g., employees, retirees, consumers, or other businesses. These agreements define the rights and responsibilities of each party to the transaction. The agreement between the business and the financial institution also establishes the method and procedures by which the payments are processed and settled.

The authorization by the receiver generally includes provision of a financial institution name and routing number and the appropriate account number for the transactions. According to a preapproved schedule, the business submits computer files usually in the ACH standard format to its ODFI for processing. ACH software for personal computers, local area networks, and mainframe computers is readily available in the marketplace. Even the smallest companies can take advantage of the efficiencies of the ACH payments system. In addition, many service bureaus and financial institutions provide a variety of conversion and computer services to assist businesses. This book-electronic payments review and buyers' guide-contains listings and contact for the providers of ACH products and services.

There are currently four ACH payment formats available to meet company and business needs for timely disbursements and collections. These are cash concentration or disbursement (CCD), cash concentration or disbursement plus addenda (CCD+), corporate trade exchange (CTX), and the soon-to-be obsolete corporate trade payments (CTP). Addenda records allow the CCD+, CTP and CTX formats to both electronically transmit payments and payment-related information in standard formats between financial institutions.

The CCD payment format is the only corporate format that is not accompanied by addenda records. However, a reference number is placed in the entry detail record so that the payment and remittance advice can be reconciled by the seller (receiver).

The CCD+ format is the same as the CCD format with the addition of one addenda record. Part of the addenda record contains a payment-related information field in which data segments as defined by ASCII x12 or NACHA-endorsed banking conventions are used. This addenda record allows the transmission of limited remittance information related to the payment.

The CTX format allows a company or business to electronically transmit one payment to cover multiple invoices and associated remittance information. The CTX format allows up to 9,999 addenda records. For CTX entries, the addenda record are linked together with each succeeding addenda record carrying the next 80 characters of the message. The complete ASCII x12 820 or 835 transaction set is "enveloped" within the CTX addenda records.

Figure 4:
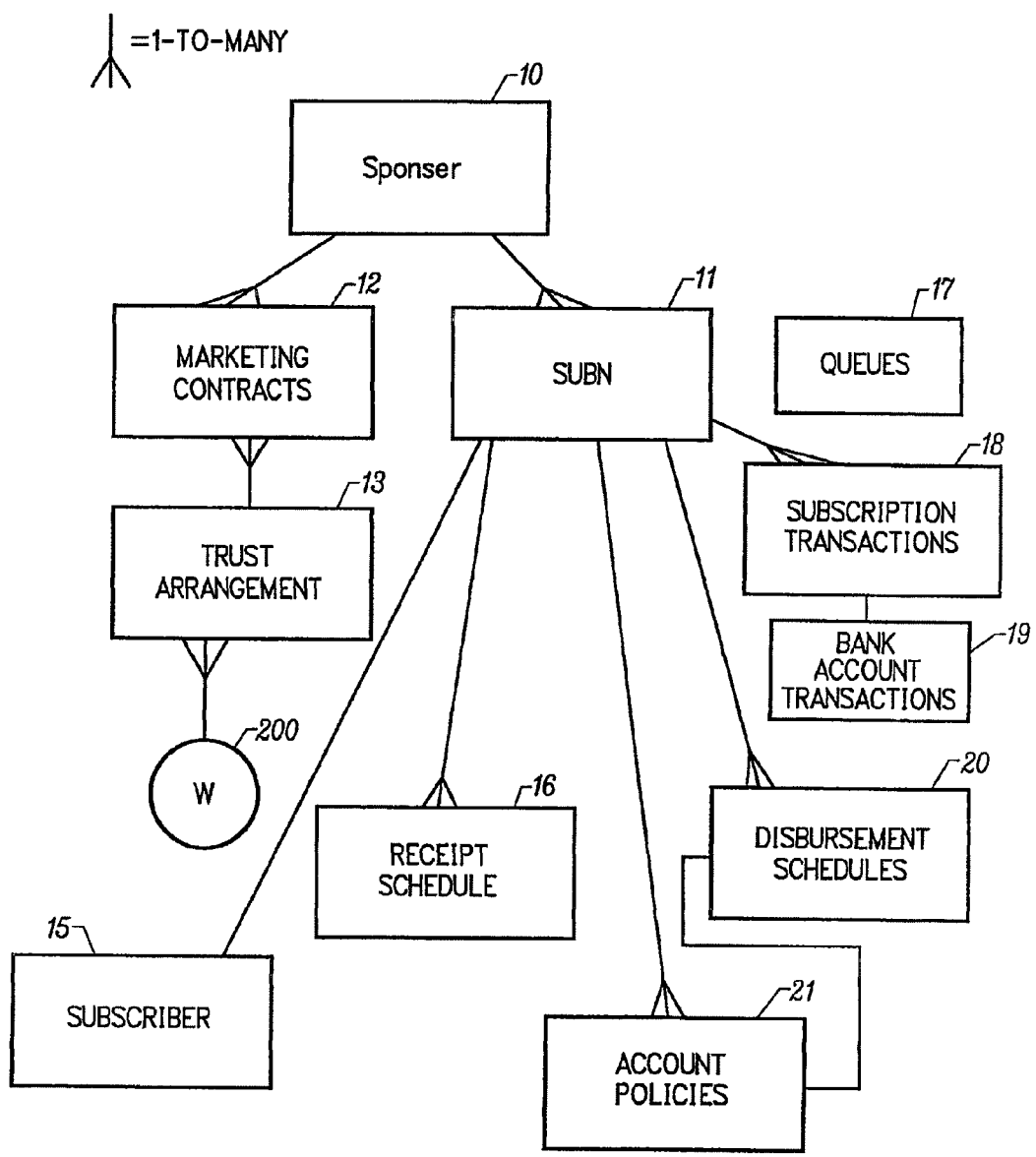
FIG. 4 is a block diagram of a debt repayment system.

FIG. 4 is a block diagram of a debt repayment system. In such system a sponsor 10 may have a plurality of marketing contracts 12 which are under supervision of a trust arrangement 13. The trust arrangement is used to move money as set forth on FIG. 2 (200). In FIG. 4, a W is used to represent the four legs of money movement shown in FIG. 2. In contrast to the prior art arrangement, a key element of the invention is that each leg of the W moves money independently of each other leg. Thus, the invention can route money along each leg of the W as desired. Unlike the prior art, the invention therefore provides the asynchronous movement of money pursuant to a trust arrangement.

Continuing with the conversation of FIG. 4, a subscription 11 is established for a subscriber 15. The subscription may have one or more receipt schedules 16. The subscription also includes one or more disbursement schedules 20 and one or more account policies 20. The disbursement schedules and account policies bear a one to one relationship. That is, an account policy may only have a single disbursement schedule and a disbursement schedule may only be associated with a single account policy. The subscription may also include a plurality of subscription transactions 18 as established through queue 17. Each subscription transaction may include a corresponding bank account transaction 19.

Figure 5:
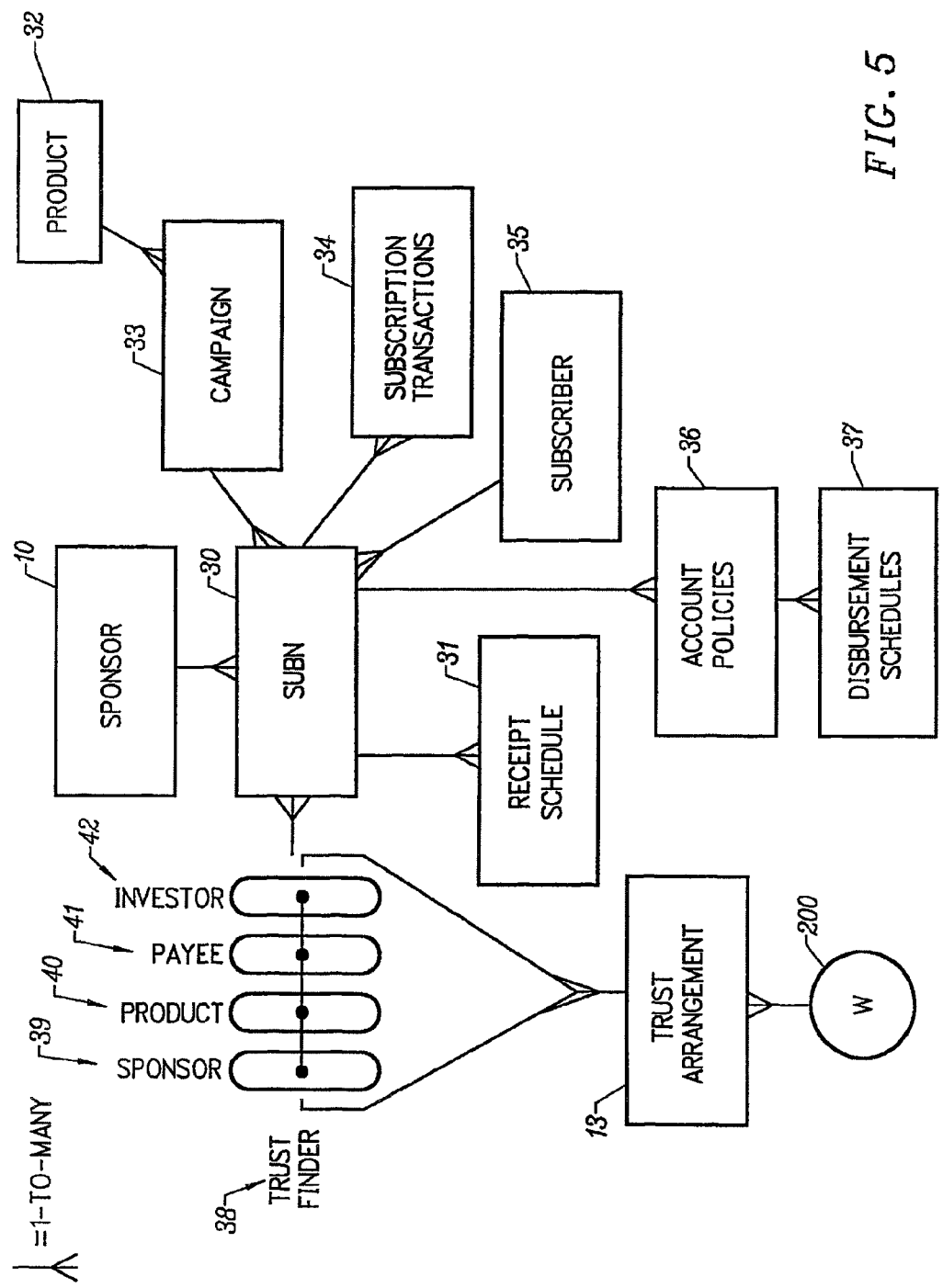
FIG. 5 is a block diagram of a debt repayment system according to the invention.

FIG. 5 is a block diagram of a debt repayment system according to the invention. It should be noted at the outset that key architectural improvements are provided over the system shown on FIG. 4. Among the features of one embodiment of the invention are:

1. Each subscriber may be associated with multiple transactions involving the movement of money;
2. A single subscription transaction table is provided which contains all data for moving money;
3. A subscriber can have one physical loan with multiple recurring payment records, i.e., there is a logical grouping of disbursements for a given instrument;
4. A trust finder function provides a join across multiple tables for trust arrangements to map money movements; and
5. A campaign product is provided for managing money based upon product type and destination of funds.

The foregoing features of the invention provide flexibility to allow movement of money independently along each leg of the money path, i.e., the "W" of FIG. 2. However, unlike the prior art, the foregoing advantages are provided by the invention. Limitations of the prior art reside in the fact that a customer has a single subscription with a single balance to a single custody account. Thus in the prior art, one money movement pattern per customer. The invention, however, provides multiple money movement patterns per customer. Thus, multiple products may be provided with different characteristics, i.e., some may pay interest while others may not pay interest. Thus, a single customer may be provided with a mortgage acceleration product that does pay interest and a credit card restructure product that does not pay interest.

As shown on FIG. 5, a sponsor 10 may have many subscriptions 30. Each subscription can include a plurality of receipt schedules 31. Each subscription may also include a plurality of subscription transactions 34. Additionally, with regard to a subscription 30 a plurality of subscribers 35 may be associated with a subscription. In contrast to the prior art, in which a subscription transactions includes a single bank account transaction, the invention provides a single subscription transaction table which contains all data for moving money. Such arrangement is efficient and reliable in that all information is contained in one location in contrast to the many locations required by the prior art.

As further mentioned above, a one-to-many subscriber arrangement is provided by the invention. Thus, all money transactions for a subscriber are maintained in a single file.

The invention also provides a plurality of account policies 36 for a subscription, each of which may have a plurality of disbursement schedules 37. This aspect of the invention provides a logical grouping of disbursements for a given instrument which stores and organizes data more efficiently.

The invention also provides a trust finder function 38 which, in the preferred embodiment of the invention, includes tables for a sponsor 39, product 40, payee 41, and investor 42. The trust finder provides a join across the four tables which defines the trust arrangement in such a way to map money movements. Thus, additional attributes may be provided to define the money movement process. Such definition is crested by the join across the four tables.

The invention also provides a campaign product feature by which a campaign 33 may be offered to a plurality of subscriptions. Each campaign, in turn, may comprise a plurality of products 32. This arrangement allows the management of money based on product type where money is being remitted. Thus, a product may be sold among multiple campaigns.

Figure 6:
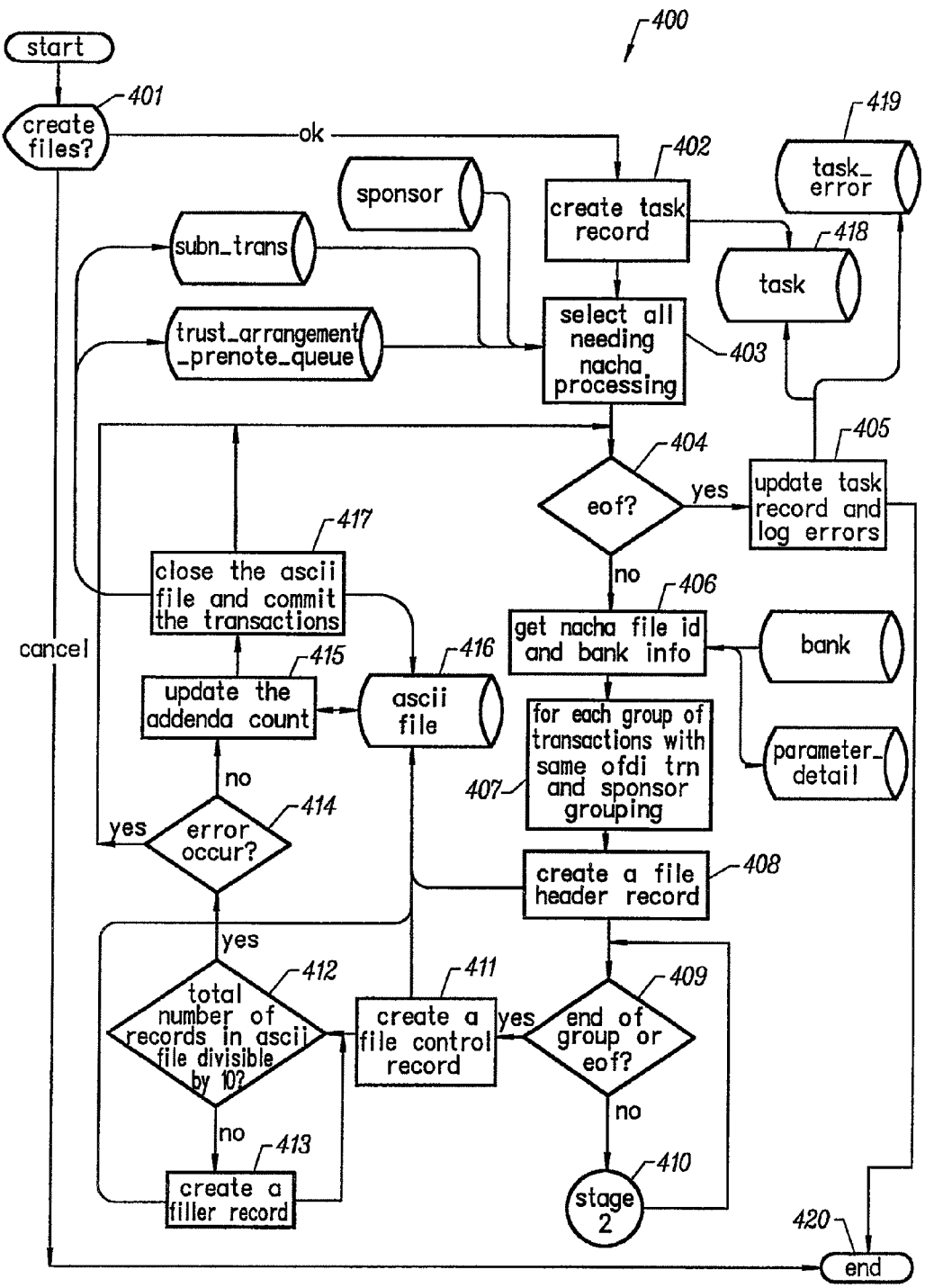
FIG. 6 is a flowchart diagram of a create ACH-file process embodiment of the present invention.

FIG. 6 represents a create ACH-file process 400 that runs through the subscription transaction records and the trust arrangement prenote queue records that require NACHA processing. Process 400 creates an ASCII file of bank transaction instructions. An ASCII file is generated for each ODFI bank and appropriate sponsor combination included in the system. Upon successful creation of the each ASCII file, the status of the associated subscription transaction or trust arrangement prenote queue changes. The process displays a message box in a step 401 to ask if the user wishes to create an ACH file. If the user chooses to cancel the process, the process is aborted. Otherwise, the process 400 creates a task record in a step 402. In a step 403, the process selects all subscription transaction and trust arrangement prenote queue records that require NACHA processing. It sorts the transactions by sponsor grouping requirements, ODFI transit routing number, transaction date, queue type, ODFI account number, RCVG transit routing number, RCVG account number and NACHA transaction code. An end-of-file test 404 checks to see if all the transactions have been processed. If so, a step 405 updates the task record and logs any errors. A step 406 retrieves a NACHA File ID and the bank information. A step 407 sorts out each group of transactions that have the same sponsor grouping requirement and ODFI transit routing number. A NACHA File header record is created in a step 408. A test 409 checks to see if this is the end of a group or and end-of-file. If not, processing continues on to process 500 (FIG. 5) through a connector 410. A step 411 creates a NACHA file control record. A test 412 checks if the total number of records in an ASCII file is divisible by ten. If not, a step 413 creates filler records to bring the count of records up to a multiple of ten. A test 414 looks to see if any errors have occurred. If not, a step 415 updates an addenda count in a NACHA ASCII file 416. A step 417 closes the NACHA ASCII file 416 and then commits the transaction updates The step 405 updates a task file 418 and task-error file 419. An exit 420 ends the process.

Figure 7:
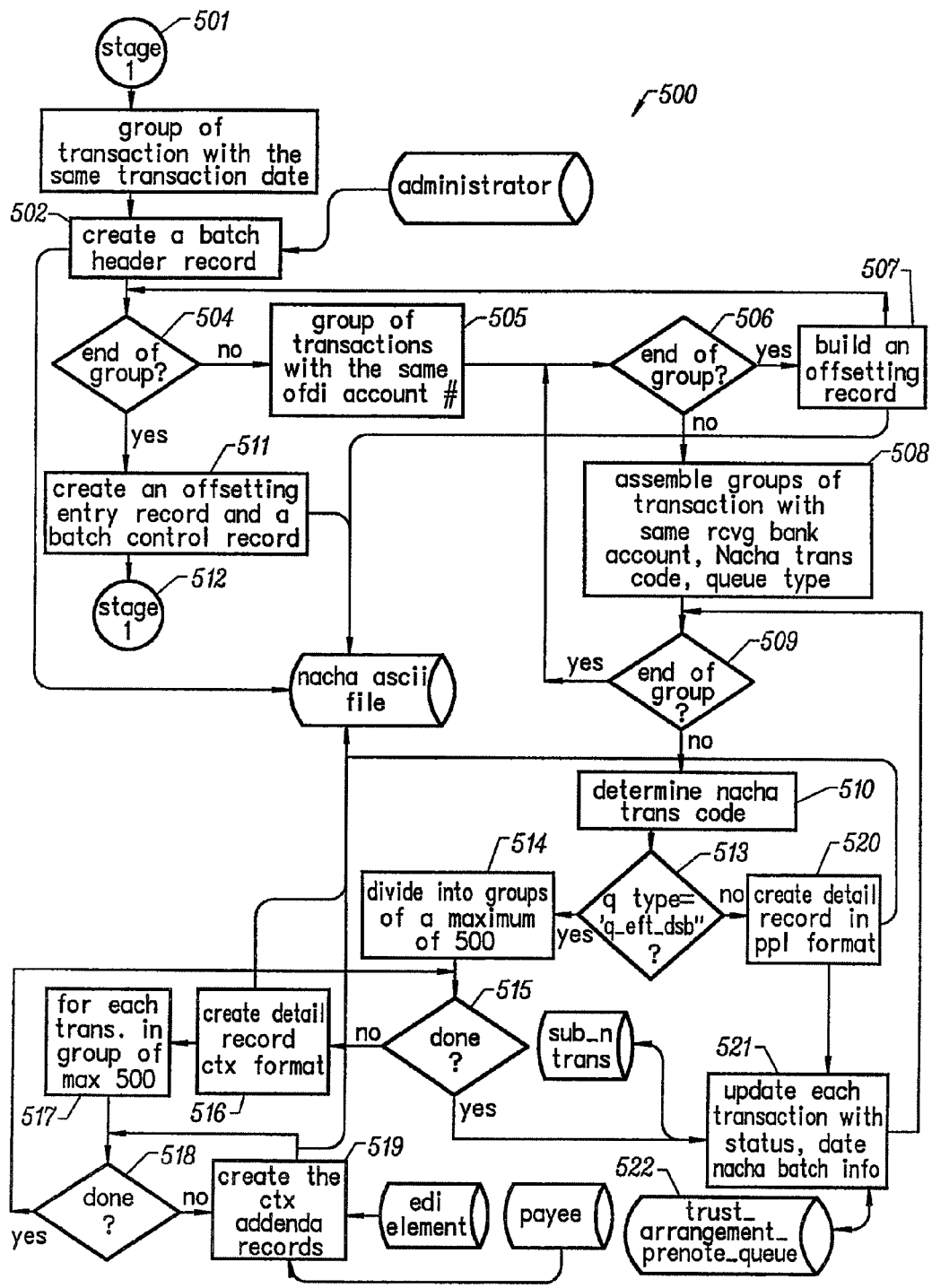
FIG. 7 is a flowchart diagram of a second part of the create ACH-file process of FIG. 6.

FIG. 7 represents a process 500. A connector 501 continues from connector 410 (FIG. 4). In a step 502, for each group of transactions that have the same transaction date, the process creates a NACHA batch header record. A test 504 checks to see if this is the end of a group. In a step 505, for each group of transactions that have the same ODFI account number a test 506 checks for the end of the group. If yes, a step 507 builds an offsetting record and returns to test 504. If test 506 is no, then a group of transactions that have the same RCVG bank account, NACHA trans code and queue type are assembled. If this is the end of such a group, then a test 509 returns control back to test 506. Otherwise, a step 510 is used to determine the NACHA trans code. If the answer in test 504 was yes, the a step 511 creates an offsetting entry record and batch control record. Control is returned through a connector 512 back to process 400.

A test 513 checks to see if the transaction's queue type is "EFT DSB." If so, a step 514 divides the set of transactions having the same RCVG transit routing number, RCVG account number and NACHA transaction code into groups of five hundred transactions or less. A test 515 checks if all such groups of five hundred or less transactions have been processed. A step 516 and 517 creates a NACHA detail record in CTX format. A test 518 checks if all the transactions in a group have been processed. Each transaction included in the NACHA detail record is used in a step 519 to create a set of NACHA CTX addenda records formatted by the payee's EDI element records. If the answer in test 513 is no, then a step 520 creates a NACHA detail record in PPL format. A step 521 updates the status of each subscription transaction or trust arrangement prenote in a queue 522 to "cleared" or "pending". (Pending status only applies to prenote and receipt transactions.)

Figure 8:
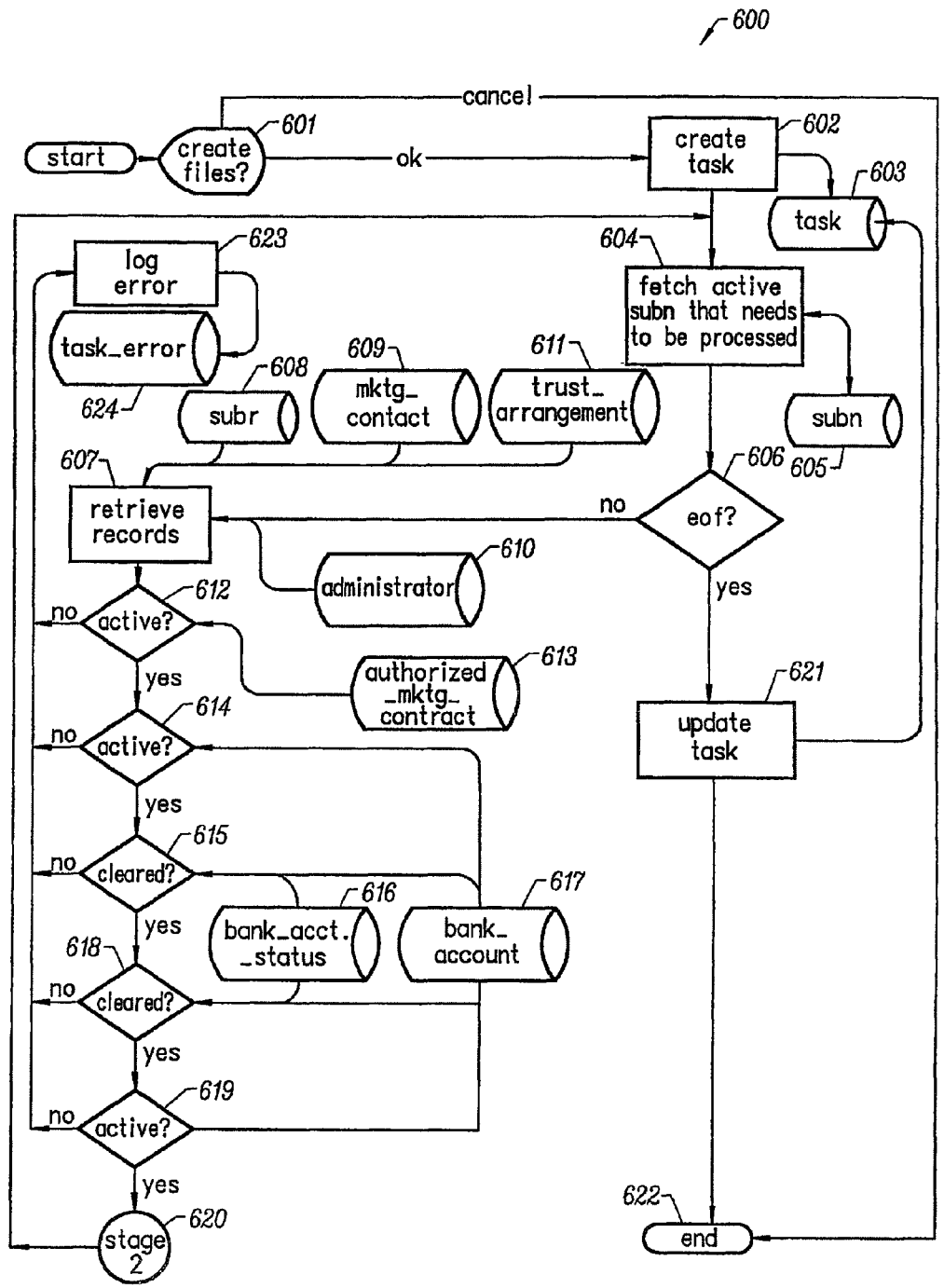
FIG. 8 is a flowchart diagram of a generate receipts/disbursements process embodiment of the present invention.

FIG. 8 represents a generate receipts/disbursements process 600 that runs through active subscriptions, and generates subscription transactions for each active receipt schedule or disbursement schedule that is scheduled to cycle. A step 601 displays a message box to ask if the user wishes to generate receipts and disbursements. If the user instead chooses to cancel the process, the process is aborted. A step 602 creates a task record in a task file 603. Each active subscription that is associated with either an active disbursement schedule or an active receipt schedule that has a next cycle initiate date that is less than or equal to the current system date is fetched by a step 604 from a subscription file 605. The subscriptions are sorted by the trust arrangement. A test 606 looks for an end-of-record. If not, a step 607 retrieves records associated with the subscription from a subscriber file 608, a marketing contract file 609, an administrator file 610, and a trust arrangement file 611. A test 612 validates the records associated with the subscription to see if there is an authorized marketing contract that it is active prior to or on the current system time. This is done by looking in an authorized marketing contract file 613. A test 614 verifies that the particular bank account, or receipt account specified by the subscriber trust arrangement, is active. A test 615 checks to see if the holding account specified by the subscriber trust arrangement is active and the bank account status is cleared. A bank-account-status file 616 and a bank-account file 617 are consulted. A test 618 checks to see if the service fee account specified by the subscriber trust arrangement is active and the bank account status is cleared. A test 619 checks to see if the EFT disbursement account specified by the subscriber trust arrangement is active.

When all of the records associated with a subscription pass validation, e.g., tests 614, 615, 618, and 619, control passes to process 700 through a connector 620. If the end-of-file is encountered in test 606, a step 621 updates the task file 603. Process 600 then ends at an exit 622. If any of the records associated with a subscription fail validation, e.g., tests 614, 615, 618, and 619, control passes to step 623 that logs the error in a task-error file 624.

Figure 9:
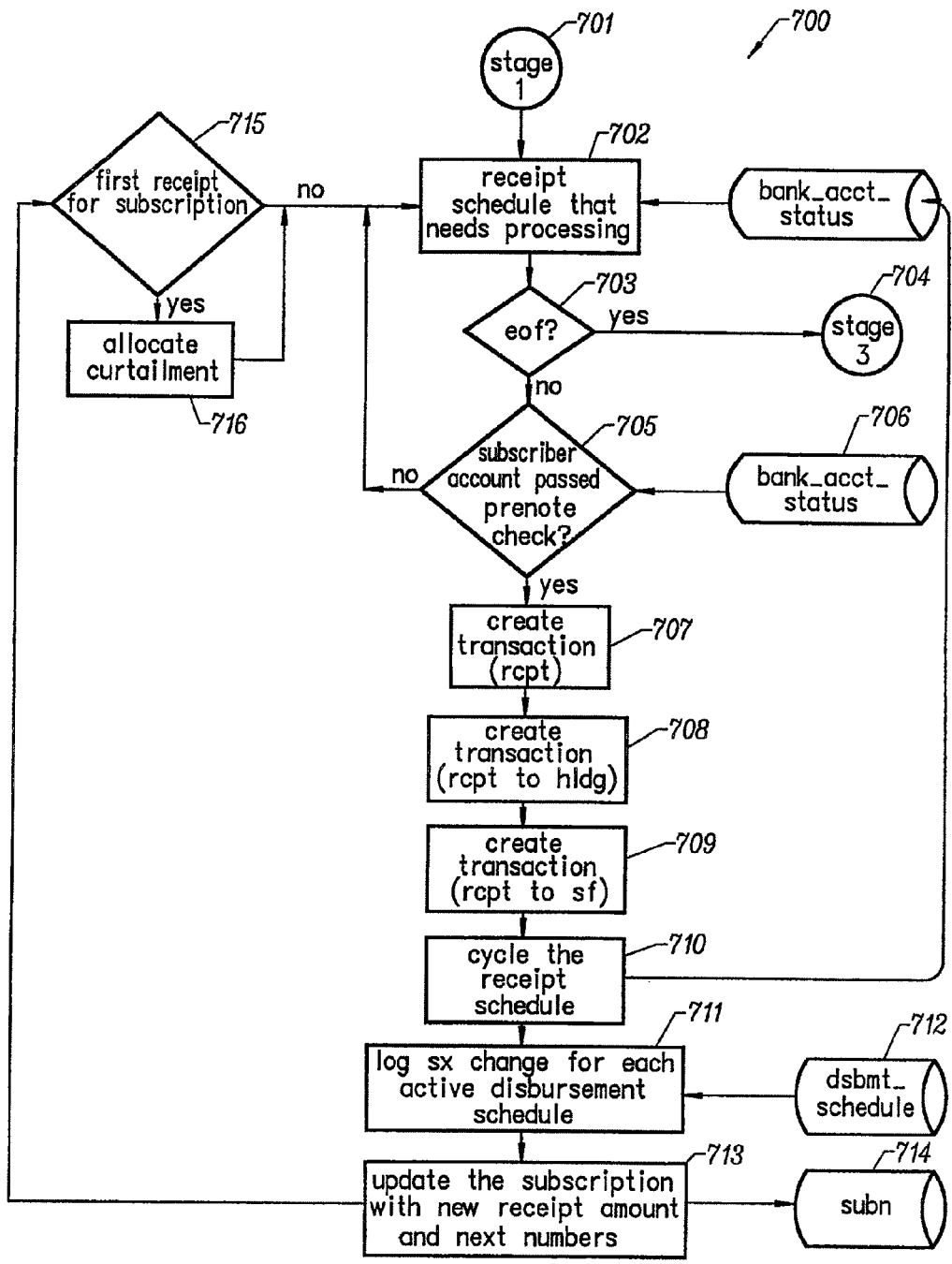
FIG. 9 is a flowchart diagram of a second part of the generate receipts/disbursements process of FIG. 8.

FIG. 9 represents a stage 2 process 700. A connector 701 receives control from connector 620 in process 600. Each receipt schedule that needs processing passes through a step 702. A test 703 looks for an end-of-file marker in the file. If one is found, control passes through a connector 704 to a process 800. A test 705 sees if the schedules' associated bank account status 706, the subscriber account specified by the receipt schedule, has passed the prenote process and the schedule also has a receipt method code of EFT. A step 707 creates the transaction records that are associated with the retrieval of the receipt funds from the subscriber's account to the receipt account. A step 708 creates the transaction records that are associated with the movement of the receipt base amount from the receipt account to the holding account. A step 709 creates the transaction records that are associated with the movement of the receipt service fee amount from the holding account to the service fee account. A step 710 cycles the receipt schedule. A step 711 logs an SX change record for each active disbursement schedule associated with the subscription that has a payee requiring notification. The log is maintained in a disbursement schedule file 712. A step 713 updates the subscriptions current balance with the receipt amount and changes the subscription transaction next number in a subscription file 714. A test 715 checks if the process is working on its first receipt schedule for this subscription. If yes, then a step 716 allocates a curtailment to the subscriber disbursement schedules. If the schedules associated bank account status (subscriber) has not passed the prenote process, or the schedule does not have a receipt method code of EFT, then the process skips the receipt schedule and processes the next schedule.

Figure 10:
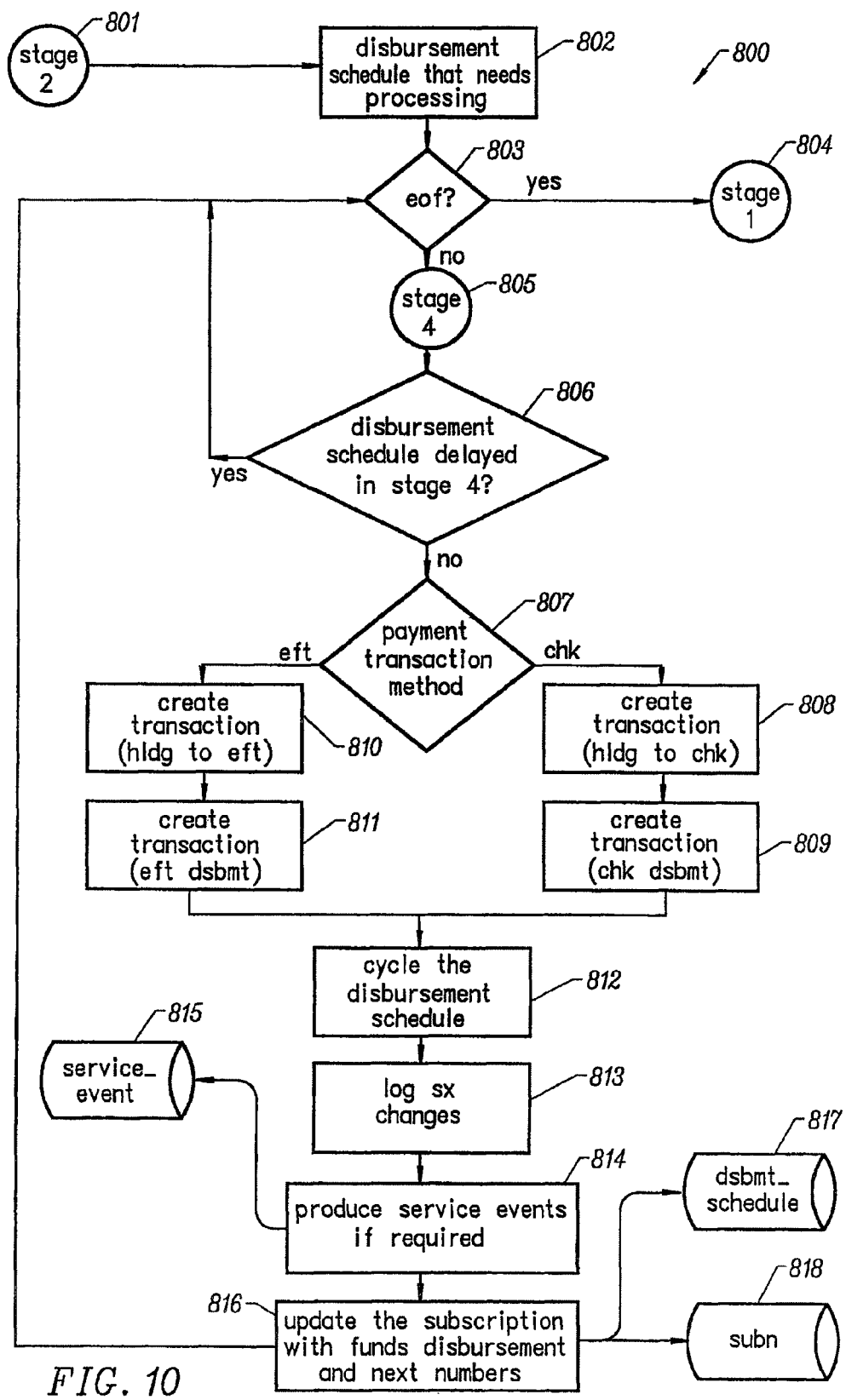
FIG. 10 is a flowchart diagram of a third part of the generate receipts/disbursements process of FIG. 8.

FIG. 10 represents a process 800 that is entered through a connector 801 from connector 704 in process 700. Each disbursement schedule that needs to be processed passes through a step 802. A test 803 looks for an end-of-file marker in the file. If one is found, control passes through a connector 804 to the process 600. Otherwise, a subroutine call 805 is made to process 900. A return is made to a test 806 which looks to see if the disbursement is delayed in process 900. If not, a test 807 checks if the payment transaction method is to be electronic funds transfer (EFT) or by check (CHK). If CHK, then a step 808 creates the transaction records that are associated with the movement of the disbursement amount from the holding account to the check disbursement account. A step 809 creates the transaction records that are associated with the creation of the corresponding check. If the payment transaction method is by electronic funds transfer, a step 810 creates the transaction records that are related with the movement of the disbursement amount from the holding account to the EFT disbursement account. A step 811 creates the transaction records that are associated with the payment of the disbursement amount to the payee. A step 812 cycles the disbursement schedule. A step 813 produces a SX change record. A step 814 produces a series of appropriate service events in a file 815. A step 816 updates the subscriber current balance, funds disbursed, and "next" numbers. Such updates are sent to a disbursement-schedule file 817 and a subscription file 818.

Figure 11:
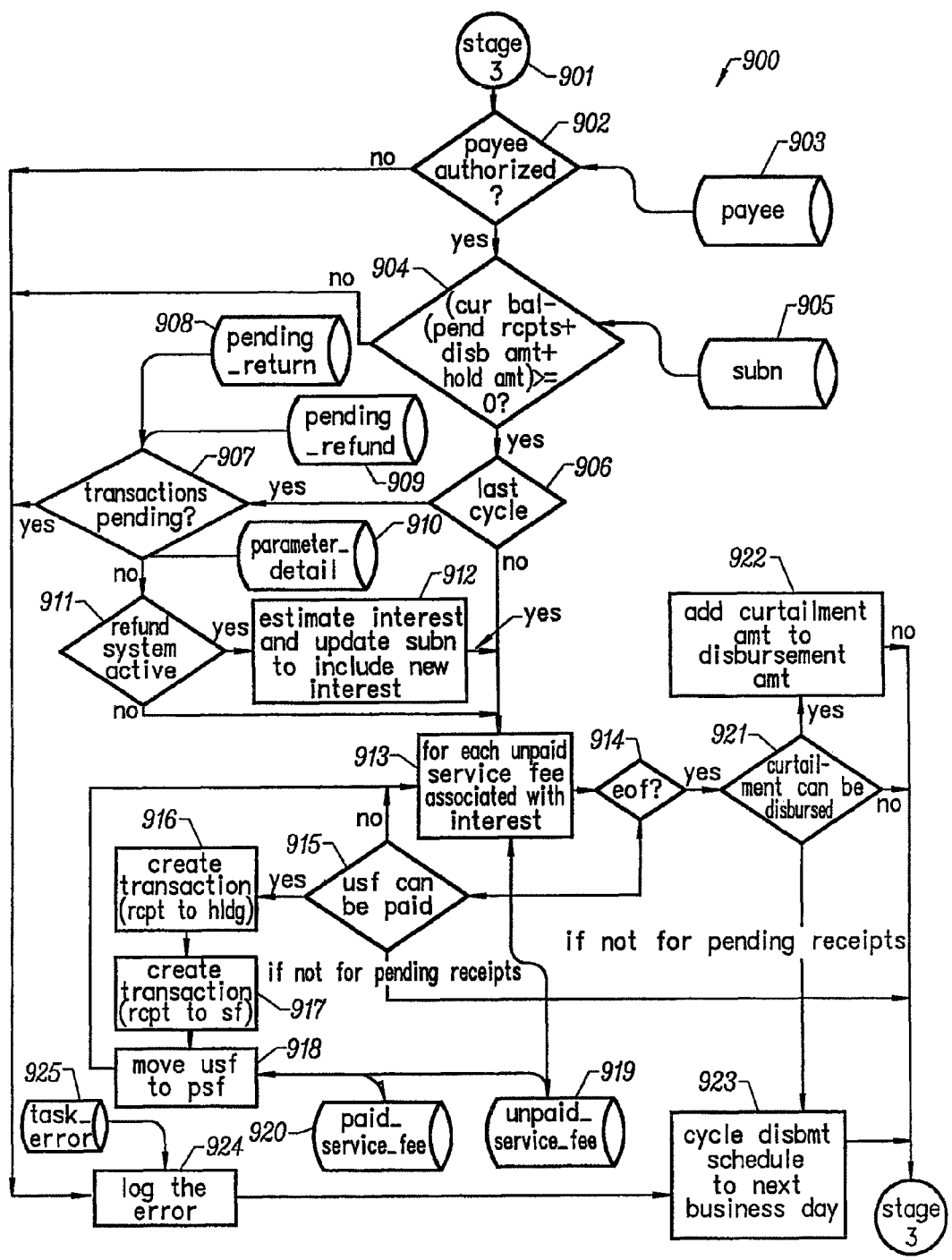
FIG. 11 is a flowchart diagram of a fourth part of the generate receipts/disbursements process of FIG. 8.

FIG. 11 represents a process 900 that is entered through a connector 901. A test 902 checks to see if the payee is authorized according to a payee list in a file 903. If so, a test 904 checks to see if the scheduled funds are disbursed, will the subscriber available current balance remain above zero? (E.g., available current balance= SUBN.CURRENT_BALANCE_AMT−(SUBN.PENDING_RCPT+SUBN.HOLD_AMT)) A subscription file 905 provides data for the calculation. If yes, a test 906 looks to see if this is the last cycle the disbursement schedule is being processed. If yes, a test 907 checks if there any pending transactions. A pending-return file 908, a pending-refund file 909, and a parameter-detail file 910 provide data for test 907. If the answer to test 907 is no, a test 911 checks if the refund system is active. If not, a step 912 estimates all unallocated interest and updates the subscription file to include new interest and decreases the subscriber minimum allowable balance to zero.

Each unpaid service fee passes through a step 913. A test 914 looks for an end-of-file. If not the EOF, a test 915 sees if there are any unpaid service fees associated with the subscription that have an amount that is less than or equal to the disbursement schedule curtailment amount and the process determines that it can pay the fee. If unpaid service fees can now be paid, a step 916 creates transaction records to withdrawn such service fees from the subscriber holding account. A step 917 creates the transaction records that are associated with the deposit of the service fee amount into the service fee account. A step 918 moves the unpaid service fee record in a file 919 to the paid service fee table and changes the status to "paid" in a file 920. The service fee amount is removed from the subscriber current balance, pending curtailment amount, and pending use amount.

If the EOF is reached in test 914, a test 921 checks to see if the curtailment can be disbursed. If so, a step 922 removes the service fee amount from the disbursement schedule's pending curtailment amount. In a step 923, if there are any unpaid service fees associated with the subscription that have an amount that is less than or equal to the disbursement schedule curtailment amount, and the process determines that the only thing stopping the payment of the unpaid service fee is the pending receipts, the disbursement is delayed until the next cycle. A step 924 logs any errors in a file 925.

Embodiments of the present invention further include an allocate curtailment program, a calculate-next-cycle dates program, a create-transaction program, an estimate-interest program, a get-schedule-status program, and a log-SX-change program. A next-cycle-dates calculation tests to see if the disbursement schedule is being delayed one business day. If so, the disbursement_schedule.next_ini-tiate_date is incremented by one business day and is verified by a calendar table. The disbursement_schedule.next_transaction_date is incremented by one business day. And if the disbursement_schedule.next_id-eal_date is older than five days, the process logs an error into a task-error table. Otherwise the process cycles the receipt or disbursement schedule according to the schedule's cycle type.

For the last cycle calculation, if all of the disbursement schedules associated with the subscription are closed except for the disbursement schedule that is currently being processed, and the disbursement schedule that is currently being processed will not cycle again prior to its end date, the projected disbursement schedule's next initiate date, then the subscription is on its last cycle.

For the fee payment calculation, if the unpaid service fee amount is less than or equal to the disbursement schedule's pending curtailment amount, the unpaid service fee can be paid if the payment of the unpaid service fee would not decrease the subscriber current balance below the subscriber minimum balance allowed, while also subtracting the subscriber pending receipt amount. Or if the payment of the unpaid service fee would not decrease the subscriber current balance below the subscriber minimum balance allowed, but requires the use of the subscriber pending receipt amount, the unpaid service fee can be paid, if the disbursement schedule was delayed until the pending receipt amount cleared. Otherwise, the unpaid service fee cannot be paid.

For the curtailment payment calculation, if the disbursement schedule is capable of curtailing money and its curtailment amount is greater than its minimum, the curtailment amount can be included in the disbursement if the payment of the curtailment amount does not decrease the subscriber current balance below the subscriber minimum balance allowed, while also subtracting the subscriber pending receipt amount. Or if the payment of the curtailment amount does not decrease the subscriber current balance below the subscriber minimum balance allowed, but requires the use of the subscriber pending receipt amount, the curtailment amount could be included in the disbursement, if the disbursement schedule was delayed until the pending receipt amount cleared. Otherwise, the curtailment amount cannot be disbursed.

For the create service event, if the sponsor associated with the subscription requires the creation of an initial enrollment service event at the time of the first disbursement and the current disbursement schedule is the subscriber primary disbursement schedule and it is on its first cycle, and if the subscription has enrollment fees that are unpaid, the process produces an "enpart" service event. Otherwise, the process produces an "enfull" service event. If the subscriber primary disbursement schedule is being processed, the process creates a "dsbfamt" service event. Otherwise, the process creates a "dsbsamt" service event. If an enrollment service fee was paid during the processing of the current disbursement schedule, the process creates an "endfrd" service event.

An allocate-curtailment program assigns portions of a specified subscriber calculated future minimum balance to each of the associated disbursement schedules that are active and have been configured to receive curtailment. The calculate next-cycle-dates calculates cycle dates given the transaction type, cycle type code, clearing delay, last ideal date and special parameters for semi-monthly loans. The create-transaction program creates the necessary transactions for subscription activity, including subscription transactions, subscription bank account business month and bank account business month records. The estimate interest program estimates interest that has not been allocated in the past for a specified subscription. The process stores the estimated amounts in the appropriate subscriber bank account bus month ("sbabm") tables and loans the total estimated interest amount to the subscription from the service fee account. The subscriber-valid-business-months are all months that fall between the subscriber start date and the subscriber closed date, or the current date, whichever is earliest. The get schedule status program is used to determine the status of a single receipt or disbursement schedule. The program returns "active", "inactive", "post active" or "suspend" as the current status, based on the values of the request, start date, end date, next cycle ideal date and suspend days. The log SX change creates an SX record for a specified disbursement schedule if the payee requires notification.

Figure 12:
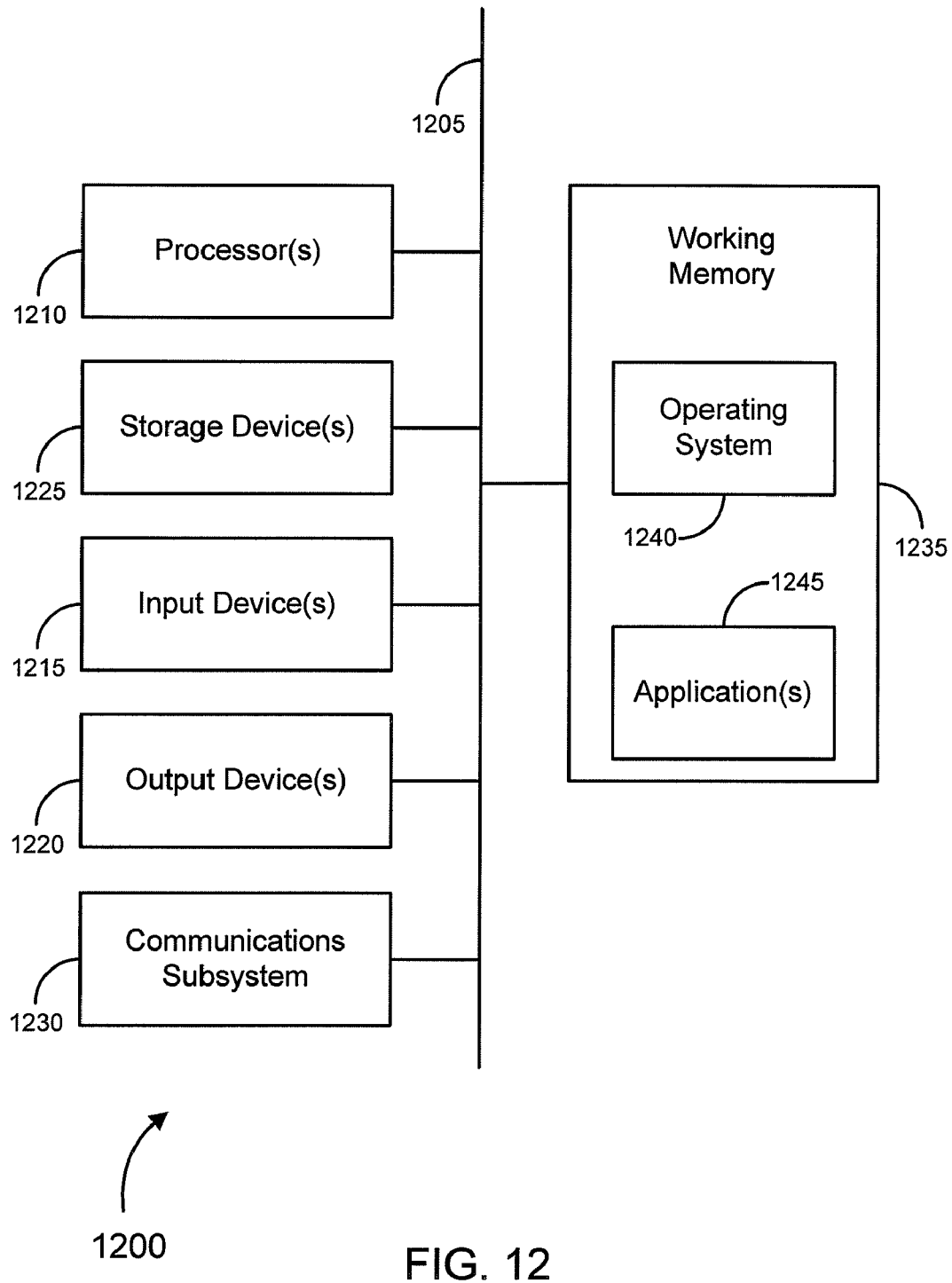
FIG. 12 is a generalized schematic diagram illustrating a computer system, in accordance with various embodiments of the invention.

FIG. 12 provides a schematic illustration of one embodiment of a computer system 1200 that can perform the methods of the invention, as described herein, and/or can function as, for example, sponsor 10 in FIG. 5. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements can include one or more processors 1210, including without limitation one or more general-purpose processors and/or one or more special-purpose processors (such as digital signal processing chips, graphics acceleration chips, and/or the like); one or more input devices 1215, which can include without limitation a mouse, a keyboard and/or the like; and one or more output devices 1220, which can include without limitation a display device, a printer and/or the like.

The computer system 1200 may further include (and/or be in communication with) one or more storage devices 1225, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 1200 might also include a communications subsystem 1230, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240 and/or other code, such as one or more application programs 1245, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1225 described above. In some cases, the storage medium might be incorporated within a computer system, such as the system 1200. In other embodiments, the storage medium might be separate from a computer system (e.g., a removable medium, such as a compact disc, etc.), and/or provided in an installation package, such that the storage medium can be used to program a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1200) to perform methods of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another machine-readable medium, such as one or more of the storage device(s) 1225. Merely by way of example, execution of the sequences of instructions contained in the working memory 1235 might cause the processor(s) 1210 to perform one or more procedures of the methods described herein (e.g., the methods on FIGS. 6-11).

The terms "machine-readable medium" and "computer readable medium", as used herein, refer to any medium that participates in providing data that causes a machine to operate in a specific fashion. In an embodiment implemented using the computer system 1200, various machine-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 1225. Volatile media includes, without limitation, dynamic memory, such as the working memory 1235. Transmission media includes coaxial cables, copper wire and fiber optics, including the wires that comprise the bus 1205, as well as the various components of the communication subsystem 1230 (and/or the media by which the communications subsystem 1230 provides communication with other devices). Hence, transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc., carried by the signals) to the working memory 1235, from which the processor(s) 1205 retrieves and executes the instructions. The instructions received by the working memory 1235 may optionally be stored on a storage device 1225 either before or after execution by the processor(s) 1210.

Figure 13:
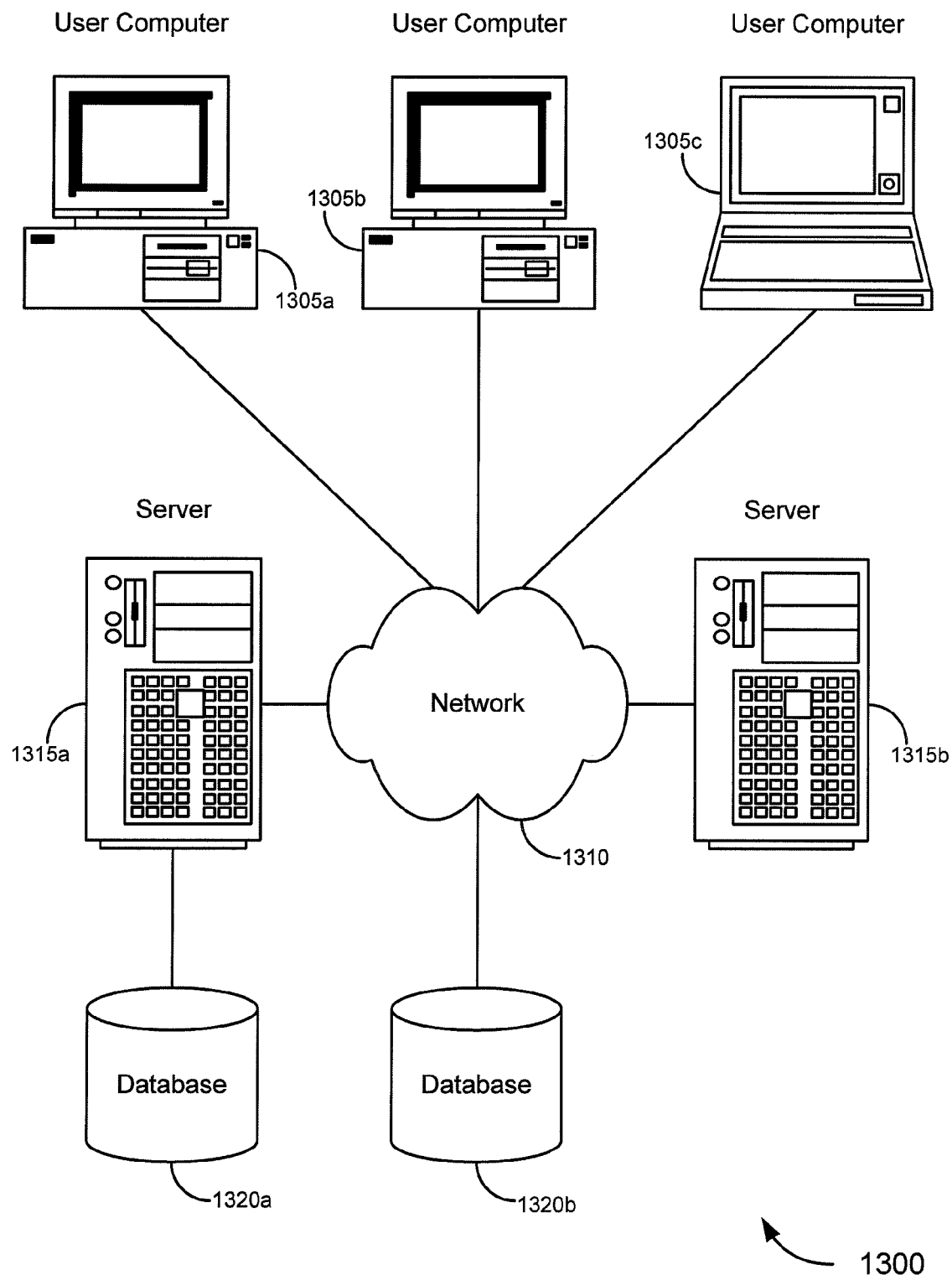
FIG. 13 is a block diagram illustrating a networked system of computers, which can be used in accordance with various embodiments of the invention.

A set of embodiments comprises systems for managing identity information and generating an identity confidence scoring system. Merely by way of example, FIG. 13 illustrates a schematic diagram of a system 1300 that can be used in accordance with one set of embodiments. The system 1300 can include one or more user computers 1305. The user computers 1305 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially available UNIX™ or UNIX-like operating systems. These user computers 1305 can also have any of a variety of applications, including one or more applications configured to perform methods of the invention, as well as one or more office applications, database client and/or server applications, and web browser applications. Alternatively, the user computers 1305 can be any other electronic device, such as a thin-client computer, Internet-enabled mobile telephone, and/or personal digital assistant (PDA), capable of communicating via a network (e.g., the network 1310 described below) and/or displaying and navigating web pages or other types of electronic documents. Although the exemplary system 1300 is shown with three user computers 1305, any number of user computers can be supported.

Certain embodiments of the invention operate in a networked environment, which can include a network 1310. The network 1310 can be any type of network familiar to those skilled in the art that can support data communications using any of a variety of commercially available protocols, including without limitation TCP/IP, SNA, IPX, AppleTalk, and the like. Merely by way of example, the network 1310 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1315. Each of the server computers 1315 may be configured with an operating system, including without limitation any of those discussed above, as well as any commercially (or freely) available server operating systems. Each of the servers 1315 may also be running one or more applications, which can be configured to provide services to one or more clients 1305 and/or other servers 1315.

Merely by way of example, one of the servers 1315 may be a web server, which can be used, merely by way of example, to process requests for web pages or other electronic documents from user computers 1305. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 1305 to perform methods of the invention.

The server computers 1315, in some embodiments, might include one or more application servers, which can include one or more applications accessible by a client running on one or more of the client computers 1305 and/or other servers 1315. Merely by way of example, the server(s) 1315 can be one or more general purpose computers capable of executing programs or scripts in response to the user computers 1305 and/or other servers 1315, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 1305 and/or another server 1315. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 1305 via a web server (as described above, for example). Similarly, a web server might receive web page requests and/or input data from a user computer 1305 and/or forward the web page requests and/or input data to an application server. In some cases, a web server may be integrated with an application server.

In accordance with further embodiments, one or more servers 1315 can function as a file server and/or can include one or more of the files (e.g., application code, data files, etc.) necessary to implement methods of the invention incorporated by an application running on a user computer 1305 and/or another server 1315. Alternatively, as those skilled in the art will appreciate, a file server can include all necessary files, allowing such an application to be invoked remotely by a user computer 1305 and/or server 1315. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1320. The location of the database(s) 1320 is discretionary: merely by way of example, a database 1320a might reside on a storage medium local to (and/or resident in) a server 1315a (and/or a user computer 1305). Alternatively, a database 1320b can be remote from any or all of the computers 1305, 1315, so long as the database can be in communication (e.g., via the network 1310) with one or more of these. In a particular set of embodiments, a database 1320 can reside in a storage-area network ("SAN") familiar to those skilled in the art. (Likewise, any necessary files for performing the functions attributed to the computers 1305, 1315 can be stored locally on the respective computer and/or remotely, as appropriate.) In one set of embodiments, the database 1220 can be a relational database, such as an Oracle™ database, that is adapted to store, update, and retrieve data in response to SQL-formatted commands. The database might be controlled and/or maintained by a database server, as described above, for example.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A non-transitory machine-readable medium for bill payment, including sets of instructions stored thereon which, when executed by a machine, cause the machine to:
in a first transfer step, periodically initiate on a funds transfer schedule a debit to a designated deposit account (DDA) belonging to a debtor, wherein the fund transfer schedule comprises at least a portion of a subscription transaction table file, the subscription transaction table file comprising:
information regarding a plurality of transactions for a plurality of subscribers; and
all data necessary for effecting all of the plurality of transactions;
in a second transfer step, receive funds from the DDA to a custody account;
determine an amount of funds and a date that funds are to be transferred from the custody account to a creditor's creditor account in order to pay down both interest and principle of a debt owed and accomplish an accelerated repayment of the debt owed to the creditor by the debtor;
determine a transfer method, based on the subscription transaction table file, of whether the amount of funds are to be transferred via an Electronic Funds Transfer (EFT) or a check disbursement;
in a third transfer step, initiating a transfer of funds from the custody account;
create a transaction record of either a disbursement from the custody account to an EFT disbursement account, or a creation of a check, based on the determination of transfer method;
in a fourth transfer step, depositing the transfer of funds with the creditor;
wherein the creditor account includes an associated minimum payment frequency;
wherein the amount of funds to be transferred from the custody account to the creditor account is determined based at least in part on maintaining a minimum balance threshold value in the custody account;
wherein the date that funds are to be transferred from the custody account to the creditor account is determined based at least in part on transferring funds to the creditor account at a greater frequency than the associated minimum payment frequency;
wherein the greater frequency decreases the length of repayment of the debt;
wherein the first transfer step, the second transfer step, the third transfer step, and the fourth transfer step occur asynchronously, based on conditions specified by a trust finder, such that the transfer steps do not occur in that order; and
wherein the trust finder provides a join between parties involved in the bill payment.

2. The non-transitory machine-readable medium of claim 1, wherein the sets of instructions when further executed by the machine, cause the machine to periodically credit the DDA with a credit on a regular credit schedule.

3. The non-transitory machine-readable medium of claim 2, wherein the credit comprises a direct deposit of a debtor paycheck.

4. The non-transitory machine-readable medium of claim 1, wherein the sets of instructions when further executed by the machine, cause the machine to determine a second amount and a date that funds from the custody account are to be transferred to a second creditor's creditor account to pay a second debt owed to the second creditor by the debtor.

5. The non-transitory machine-readable medium of claim 1, wherein the debt comprises an interest-bearing debt.

6. The non-transitory machine-readable medium of claim 1, wherein the sets of instructions when further executed by the machine, cause the machine to report to the debtor a transfer of funds from the custody account to the creditor account.

7. The non-transitory machine-readable medium of claim 6, wherein the sets of instructions when further executed by the machine, cause the machine to report to the debtor an adjusted credit term.

8. The non-transitory machine-readable medium of claim 1, wherein the transferring of the funds between the DDA, the custody account, and the creditor account is performed using an originating depository financial institution (ODFI).

9. The non-transitory machine-readable medium of claim 1, wherein the sets of instructions when further executed by the machine, cause the machine to offer the debtor a campaign product.

10. The non-transitory machine-readable medium of claim 1, wherein the sets of instructions when further executed by the machine, cause the machine to receive, at the DDA, credits over time that are in excess of a particular debt owed by the debtor to the creditor.

11. The non-transitory machine-readable medium of claim 1, wherein the sets of instructions when further executed by the machine, cause the machine to provide for a computation of the accelerated re-payment.

12. The non-transitory machine-readable medium of claim 1, wherein the sets of instructions when further executed by the machine, cause the machine to transfer an excess payment to the creditor account that provides a reduction in a total finance charge earned by the creditor and charged to the debtor.

13. The non-transitory machine-readable medium of claim 1, wherein the amount of funds to be transferred from the custody account to the creditor account is further based on pending transactions.

14. The non-transitory machine-readable medium of claim 1, wherein the date that funds are to be transferred from the custody account to the creditor account is further determined based at least in part on a date of pending receipts into the custody account.

* * * * *